United States Patent [19]

Kalverkamp et al.

[11] Patent Number: 5,775,435
[45] Date of Patent: Jul. 7, 1998

[54] APPARATUS FOR SEPARATING POTATOES FROM OTHER MATERIALS

[75] Inventors: Klemens Kalverkamp; Richard Tepe, both of Damme, Germany

[73] Assignee: Franz Grimme Landmaschinenfabrik GmbH & Co. KG, Damme, Germany

[21] Appl. No.: 648,066

[22] PCT Filed: Nov. 9, 1994

[86] PCT No.: PCT/EP94/03682

§ 371 Date: May 20, 1996

§ 102(e) Date: May 20, 1996

[87] PCT Pub. No.: WO95/14376

PCT Pub. Date: Jun. 1, 1995

[30] Foreign Application Priority Data

Nov. 25, 1993 [DE] Germany .................. 43 40 101.5

[51] Int. Cl.$^6$ .................................................. A01D 17/10
[52] U.S. Cl. ........................ 171/126; 171/1; 171/27
[58] Field of Search .................... 56/904; 171/26, 171/27, 28–124, 128, 127, 126, 129, 130, 132, 138, 116; 209/498, 640, 705, 942

[56] References Cited

U.S. PATENT DOCUMENTS

| | | | |
|---|---|---|---|
| 1,784,209 | 12/1930 | Timm | 171/28 X |
| 2,953,209 | 9/1960 | DeMarcoo | 171/28 |
| 3,805,895 | 4/1974 | Teigen | 171/15 X |
| 4,416,334 | 11/1983 | Bouillon | 171/126 X |
| 4,842,076 | 6/1989 | Welp | 171/126 X |
| 5,069,292 | 12/1991 | Baker et al. | 171/126 X |

*Primary Examiner*—Michael J. Carone
*Assistant Examiner*—Robert Pezzuto
*Attorney, Agent, or Firm*—Jordan and Hamburg

[57] ABSTRACT

An apparatus for separating potatoes from other materials such as soil, clods, stones, herbage, etc., particularly for potato harvesting machines, has a number of roller bodies, which are disposed side by side with parallel axes, form revolving groups driven in pairs in opposite directions and jointly take in a separating segment, which extends from a charging end to a potato-discharging end. The roller bodies are aligned at right angles to the separating segment.

32 Claims, 11 Drawing Sheets

APPARATUS FOR SEPARATING POTATOES FROM OTHER MATERIALS

The invention relates to an apparatus for separating potatoes from other materials.

BACKGROUND OF THE INVENTION

In the case of a known apparatus of this type (WO 92/04816), roller bodies are provided as separating elements. They interact in pairs and are disposed in the longitudinal direction between the charging end and the potato-discharging end. The roller bodies, which are driven in pairs in opposite directions, separate potatoes from other materials, such as soil, clods, stones, herbage or the like owing to the fact that the potatoes, in the region of a transporting gutter that is formed as a crotch between the roller bodies rotating in opposite directions, are shifted towards the potato-discharging end under the action of the roller bodies as well as of a conveyor above the roller bodies and that the other materials are eliminated through the working gap between the roller bodies.

SUMMARY OF THE INVENTION

It is an object of the invention to develop an apparatus of the type mentioned, which can be implemented with little technical effort and makes an optimum separation process possible even in the case of different mixtures of potatoes and other materials.

Pursuant to the invention, this objective is accomplished by an.

With the apparatus constructed pursuant to the invention, a structural unit is constructed with little technical effort. For this structural unit, the roller bodies are mounted stably at the side and the potatoes are separated from other materials with short contact times in such a manner, that damage or quality impairment is avoided.

The separating segment, moreover, can be adapted with little effort by a different number of groups of roller bodies rotating in different directions to different separating tasks. The aggressiveness of the separating effect can be adjusted by changing the distance between the roller bodies as well as by changing the relative height of the separating rollers.

In an advantageous construction, the roller bodies are provided with different diameters. At the very least, the larger roller body, rotating in the conveying direction, has a high, soft elastic deformability, through which different admixtures are taken hold of reliably and the potatoes are subjected to a gentle conveying impetus. At the same time, the potatoes are moved from the respective charging end to the potato-discharging end without additional aid.

Further details and advantages arise out of the following specification and the drawings, which illustrate diagrammatically several examples of an inventive apparatus for separating potatoes from other materials.

DESCRIPTION OF THE PREFERRED EMBODIMENTS

Figure 1:
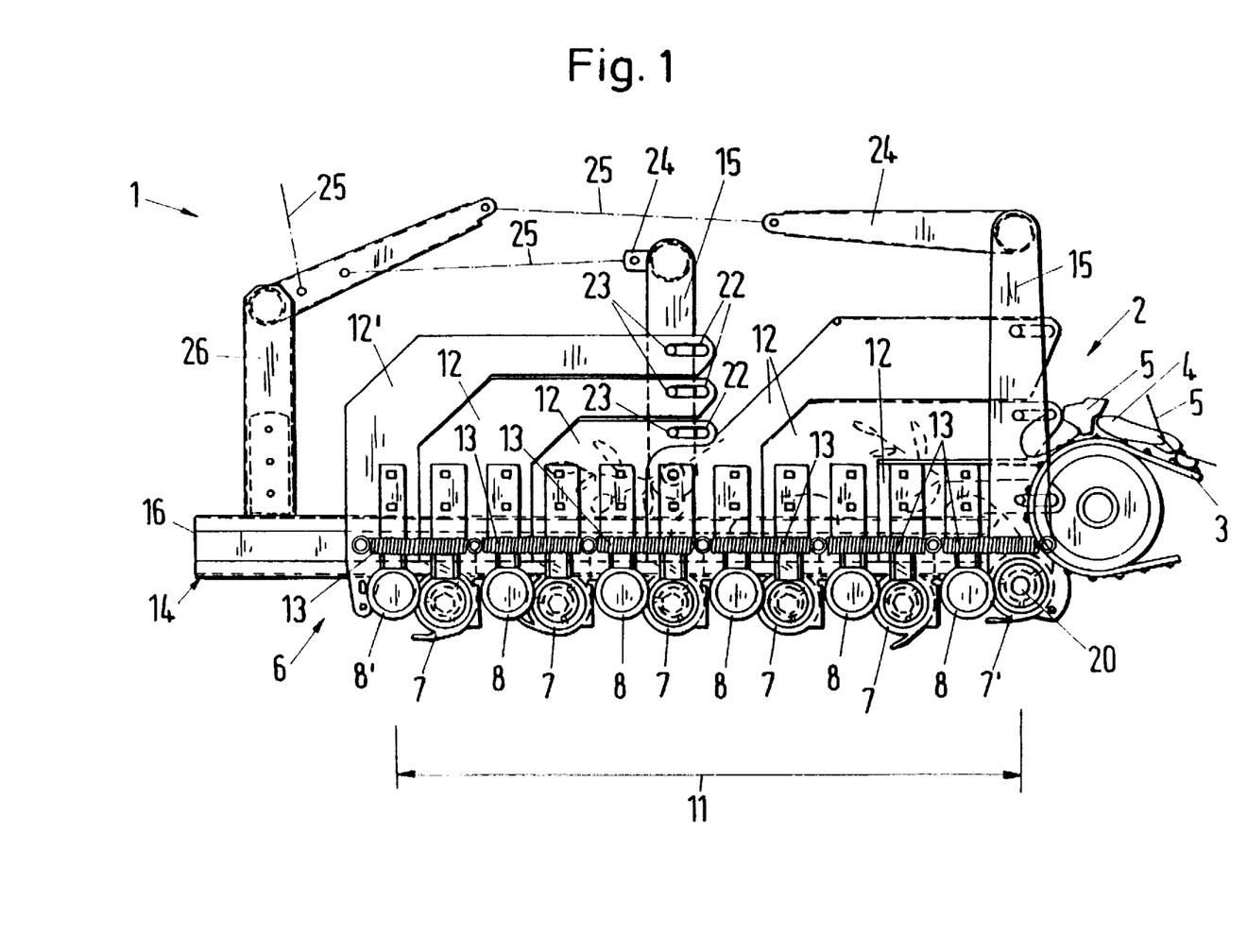
FIG. 1 shows a side view of the inventive apparatus in a first embodiment.

In FIG. 1, a first embodiment of an apparatus is shown, which is labeled 1 as a whole and provided, for example, at a potato harvesting (not shown) and which, in the operating position shown, is provided in the region of a charging end 2 by means of a conveyor belt 3 with a mixture of potatoes 4 and other materials 5, such as soil, stones and herbage.

In an advantageous development, the apparatus 1 has a number of roller bodies 7, 7', 8, 8', which are driven in opposite directions in pairs and are aligned at right angles (FIG. 4) to a separating segment 11. The roller body 7, 7', which is the first in the direction of the separating segment 11 to the potato-discharging end 6, and the respective second roller body 8, 8' of each pair from an interacting group. Moreover, the second roller body 8, 8' of each group, together with the first roller body 7 of the subsequent, adjacent group, in each case is supported with a movable supporting structure 12, which is engaged in each case, under the action of a spring 13, by a correcting element 15 supported at an apparatus frame 14.

Figure 2:
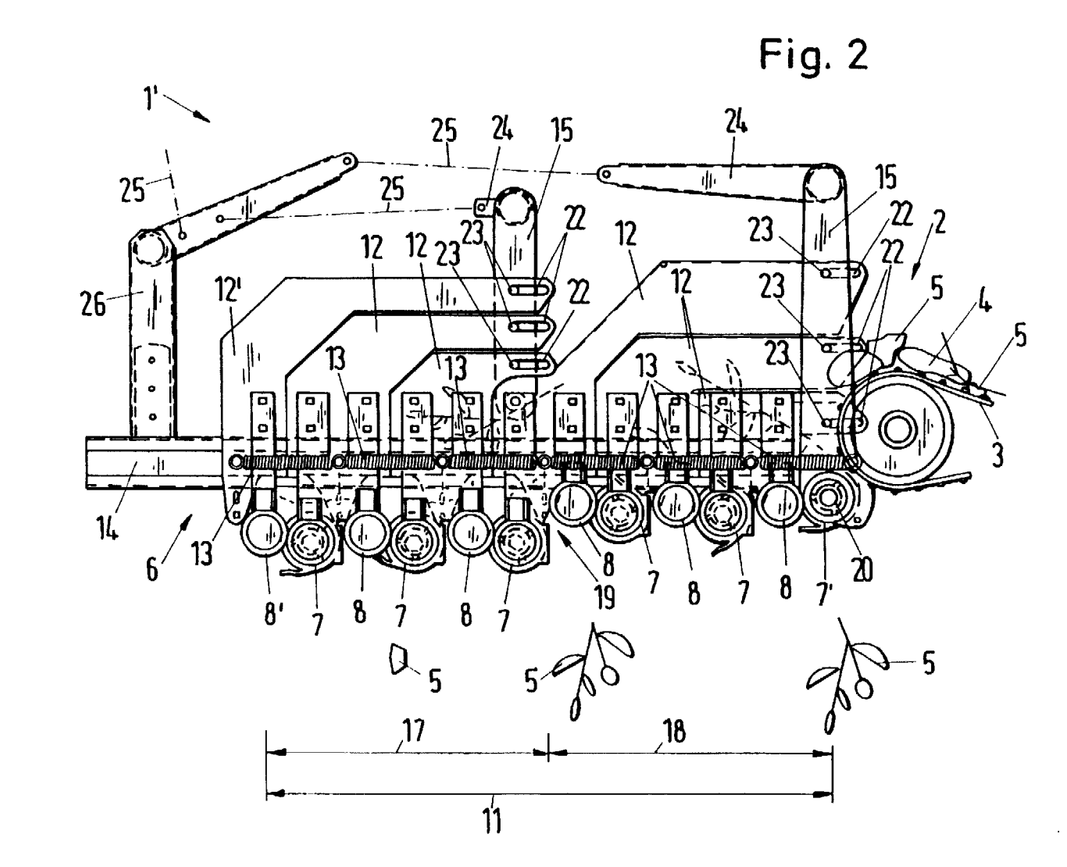
FIG. 2 shows a side view of an apparatus similar to that of FIG. 1 in a second embodiment with an arrangement of roller bodies forming an offset.

A second embodiment of the inventive apparatus 1' is illustrated in FIG. 2. In the region of the separating segment 11, this embodiment is divided into two partial regions 17, 18 with a shoulder 19, which forms a conveying region with an additional loosening action for the mixture 4, 5 between the charging end 2 and the potato-discharging end 6.

Figure 3:
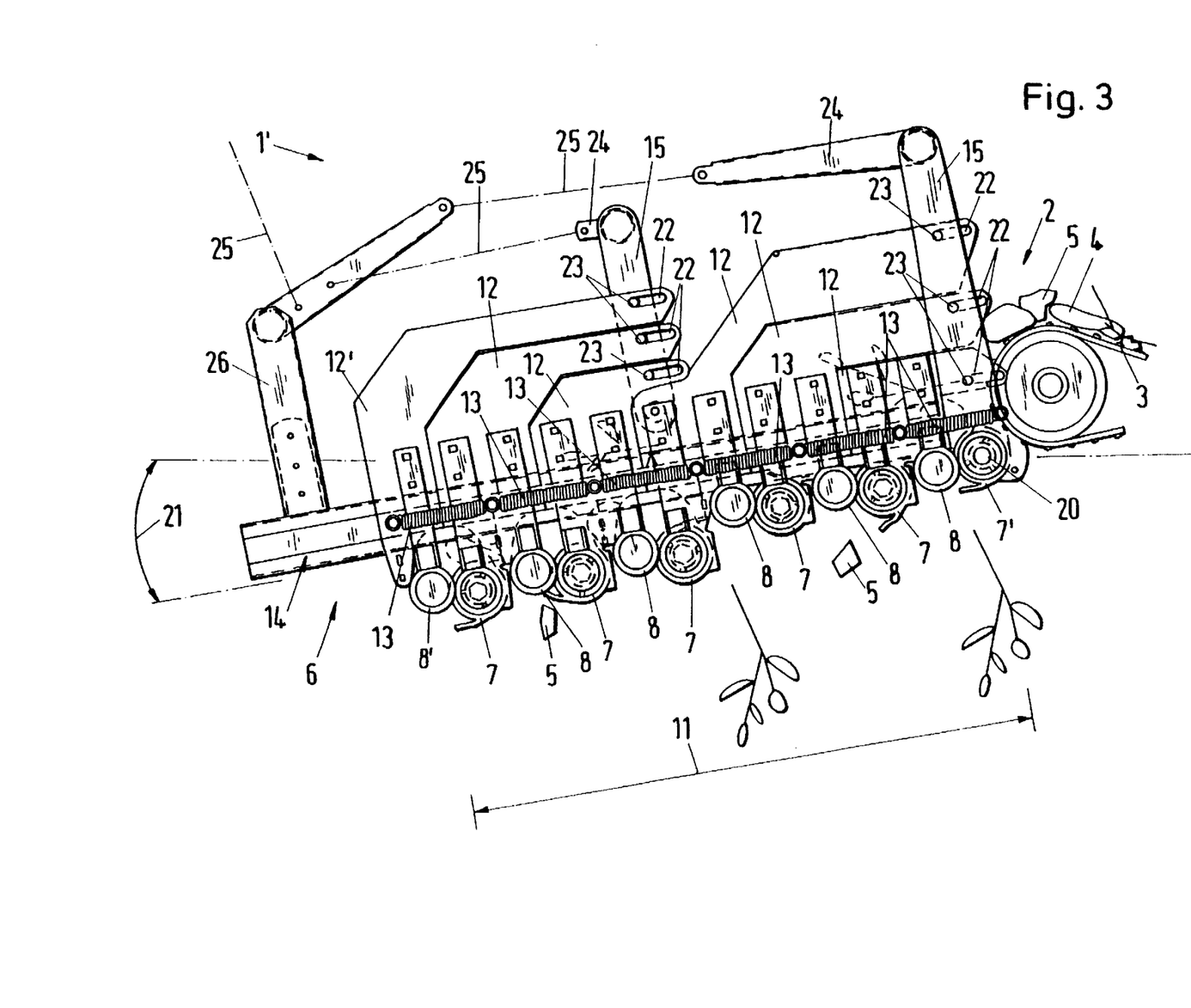
FIG. 3 shows a side view of the apparatus, similar to that of FIG. 2, in a tilted position.

In FIG. 3, the apparatus 1' is shown in a tilted position, in which the separating segment 11 has been shifted out of the horizontal working position (FIGS. 1 and 2) by an angle of tilt 21 in such a manner, that it shows a slope from the charging end 2 to the potato-discharging end 6. With this possibility for tilting, the separating segment 11 can be positioned with little effort by an adjustment about a tilt axis 20 in the region of the first roller body 7' in such a manner that, in the case of different soil structures or different other materials, infinitely variable regulation of the throughput of the apparatus can be achieved. It is likewise conceivable to construct the apparatus 1 of FIG. 1 with an axis of tilt 20 in the region of the roller body 7'.

The constructions of FIGS. 1 and 2 permit the working distances between the axes of the roller bodies 7, 7', 8, 8' within each group to be adjusted by means of the supporting structures 12 and the correcting elements 15. Starting out from the stationary roller body 7' in the separating segment 11, the subsequent rollers 8, 7 are combined over a supporting structure 12 into an adjustment group and can be adjusted jointly. At the same time, the supporting structure 12' is connected in the separating segment 11 only with the last roller body 8'.

For this purpose, the supporting structures 12 are supported groupwise in the region of a respective elongated hole 22 over a guide bolt 23 in such a manner at the correcting element 15 assigned to them, that a simultaneous adjustment of the distances between the supporting structures 12, belonging to the group, and, with that, of the roller bodies 7, 8, supported by these, can be achieved. The correcting elements 15 can be actuated in each case by means of drive mechanisms 25, which are shown only diagrammatically and which engage, on the one hand, connecting parts 24 at the adjusting levers 15 and, on the other, a stationary support 26. By tilting the correcting elements 15, working distances of equal size are formed between the roller bodies 7, 7', 8, 8' along the groups, which are shifted along the guide rails 16 of the apparatus frame 14 towards the potato-discharging end 6. The identity of the change in the working distances when moving the correcting element 15 is attained by a constant ratio of the height distances of the respective guide bolts 33 of a respective group of supporting structures 12.

Figure 4:
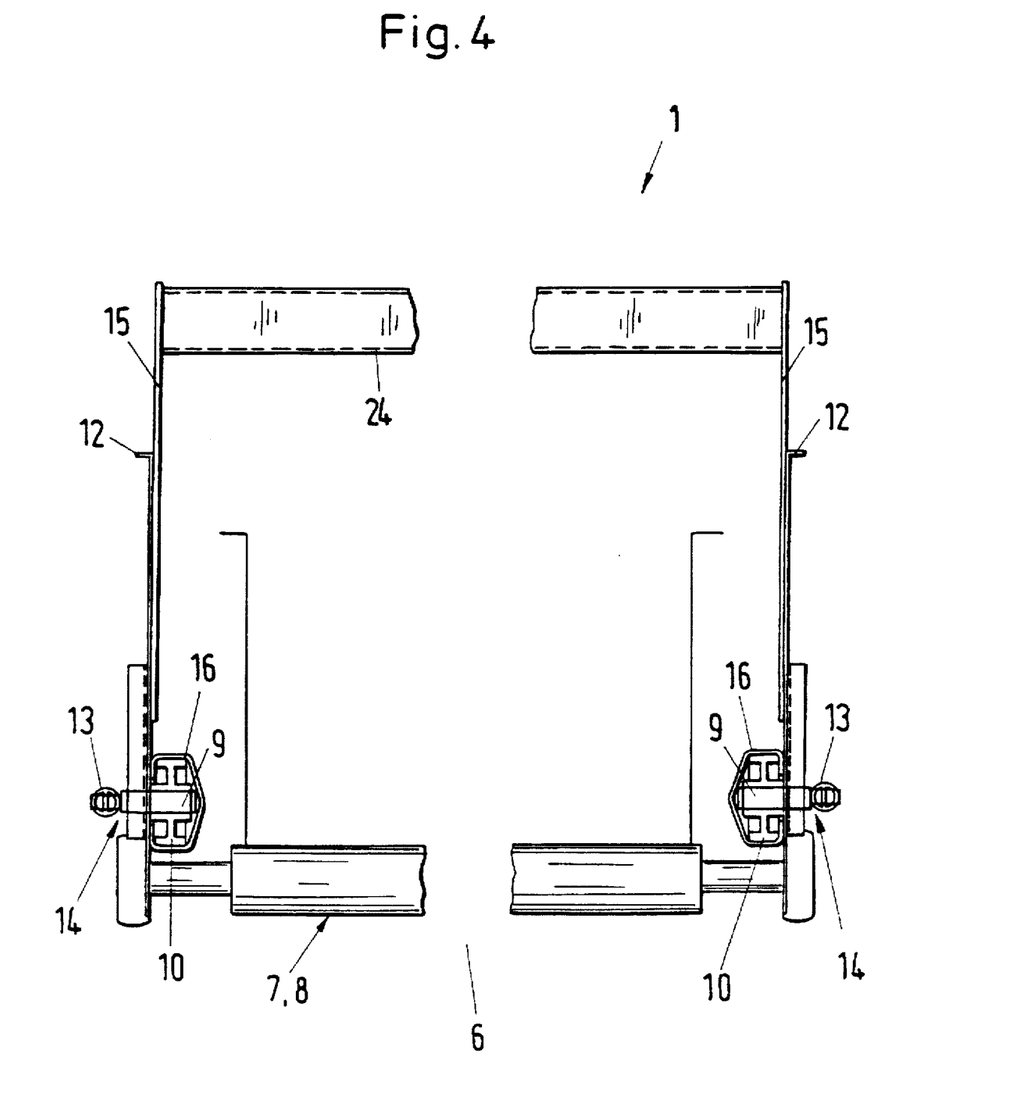
FIG. 4 shows a front view of the apparatus in the region of the potato-discharging end.

For implementing the displacement motion, the supporting structures 12 are provided with rollers 10, which are supported in guide rails 16 (FIG. 4). The axle pins 9 of the rollers 10 engage the springs 13 which, in opposition to their action, permit an increase in the axial distance, when this is brought about by means of the correcting elements 15, or when such an increase is caused by a thick stone 5 passing through a roller gap. Because of the elongated holes 22, the displaceability of the supporting structures 12 along the guide rails 16 is independent of the position of the correcting elements 15.

Figure 5:
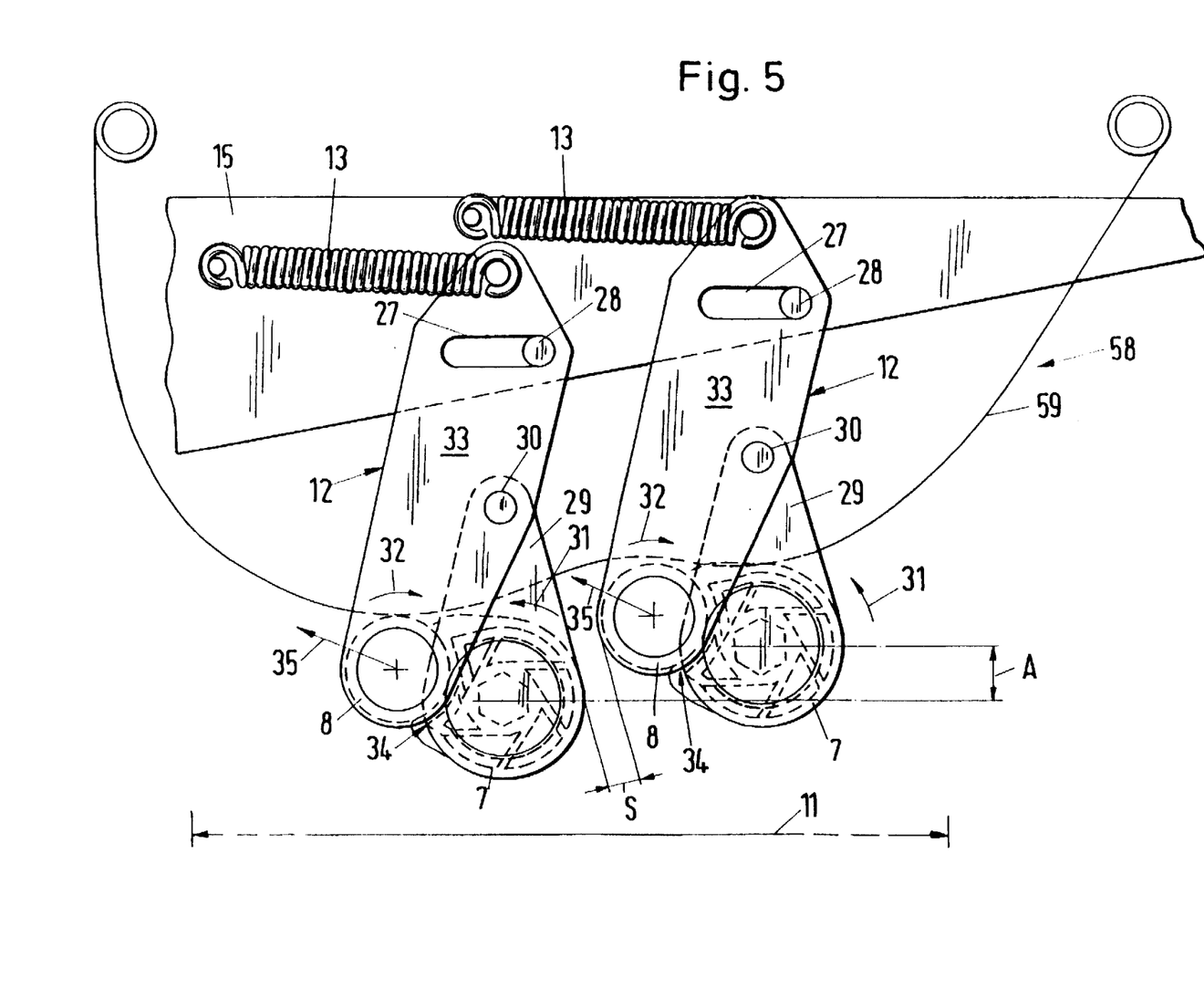
FIG. 5 shows an enlarged sectional representation of the apparatus to illustrate a first embodiment of an adjusting device.

FIG. 5 shows a modified support for the roller bodies in an enlarged, sectional representation of two groups of roller bodies 7, 8. In the case of this modification, the roller bodies are carried by supporting structures 12, which consist of a stationary connecting link 29 for the first roller body 7 and a swiveling element 33, which can he swiveled about a pivot pin 30 and on which the respective second roller body 8 is mounted. The correcting element 15, which is constructed as a sliding part, supports individual springs 13, which in each case engage a swiveling element 33. In the region of the connection with the correcting element 15, the swiveling elements 33 have an elongated hole 27, which is engaged by a guide pin 28 of the correcting element 15. At the same time, the swiveling element 33 is pulled by the spring 13 into the specified working position.

With this arrangement, a large stone 5 or similar other material, which is drawn into the working gap 34 between the roller bodies 7, 8 revolving in opposite directions indicated by the arrows 31, 32, can shift the second roller body 8 in a swiveling direction 35 in such a manner, that the large stone is eliminated downwards from the apparatus without damaging it.

In the embodiment of FIG. 5, the axles of the respective first roller body 7 are supported at a distance A in the vertical direction, as a result of which the junction plane of the separating segment 11 attains at least regionally a shoulder, similar to the shoulder of FIG. 2 or the slope of FIG. 3.

Moreover, because of the distance A, the roller body 8 can be swiveled unhindered in the direction of arrow 35 and there is a gap S to the next group of roller bodies, which ensures a trouble-free revolution of the components in all operating positions.

Figure 6:
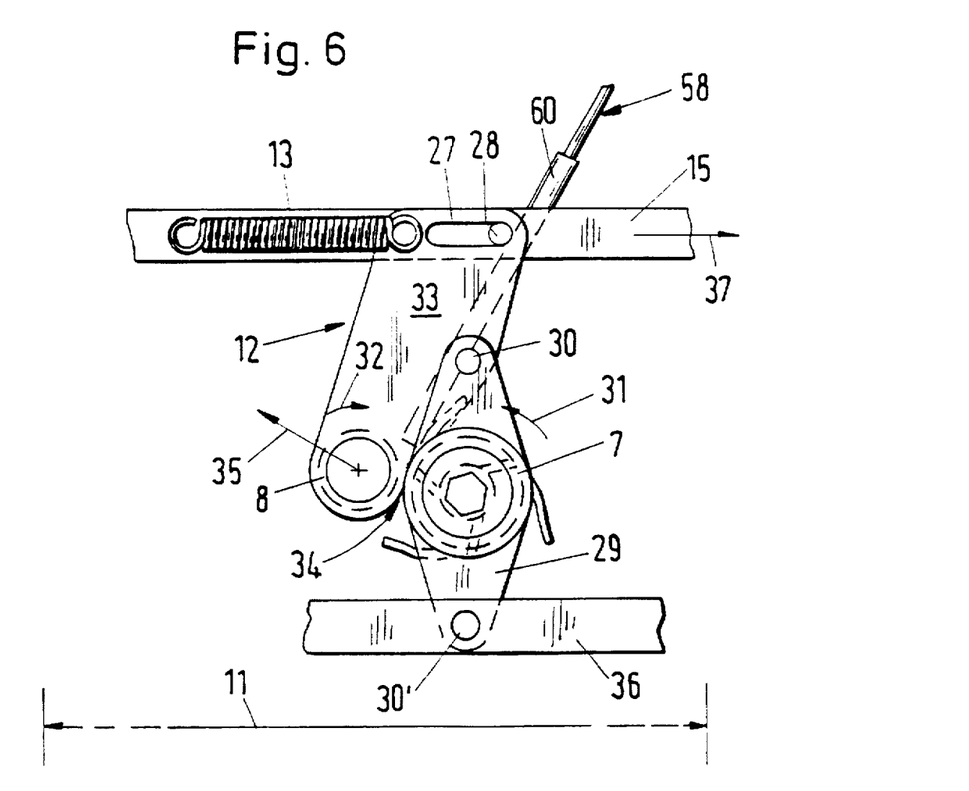
FIG. 6 shows a sectional representation to illustrate a second embodiment of the adjusting device.
Figure 7:
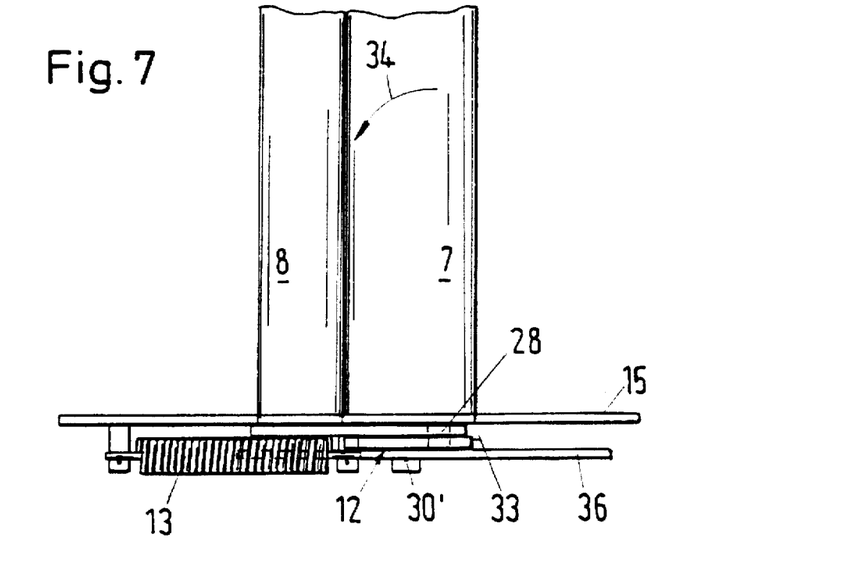
FIG. 7 shows a plan view of the representation of FIG. 6.

In FIGS. 6 and 7, a second embodiment of the possibilities for making adjustments in the area of the roller bodies 7, 8 is shown, the elongated holes 27, through which the guide bolts 28 of the correcting element 15 pass, and the springs 13 being disposed in one plane. Moreover, the connecting links 29 at 30' are hinged to a further correcting element 36 below the roller bodies 7, 8.

The working gap 34 between the two roller bodies 7, 8 can be adjusted here also under the action of a displacement force 37 acting against the tensile force of the spring 13. Moreover, as a stone 5 or other material of similar size passing through the working gap 34, the spring 13 acts as a safety element.

Furthermore, the correcting element 36 determines whether the connecting element 29 can be swiveled about or fixed to the axis of the first roller body 7 of the group so that, in connection with an adjustment of the correcting element 15, the height of the second roller body 8 with respect to its first roller body 7 in the group can be adjusted, in order to influence the aggressiveness of the separating process.

Figure 8:
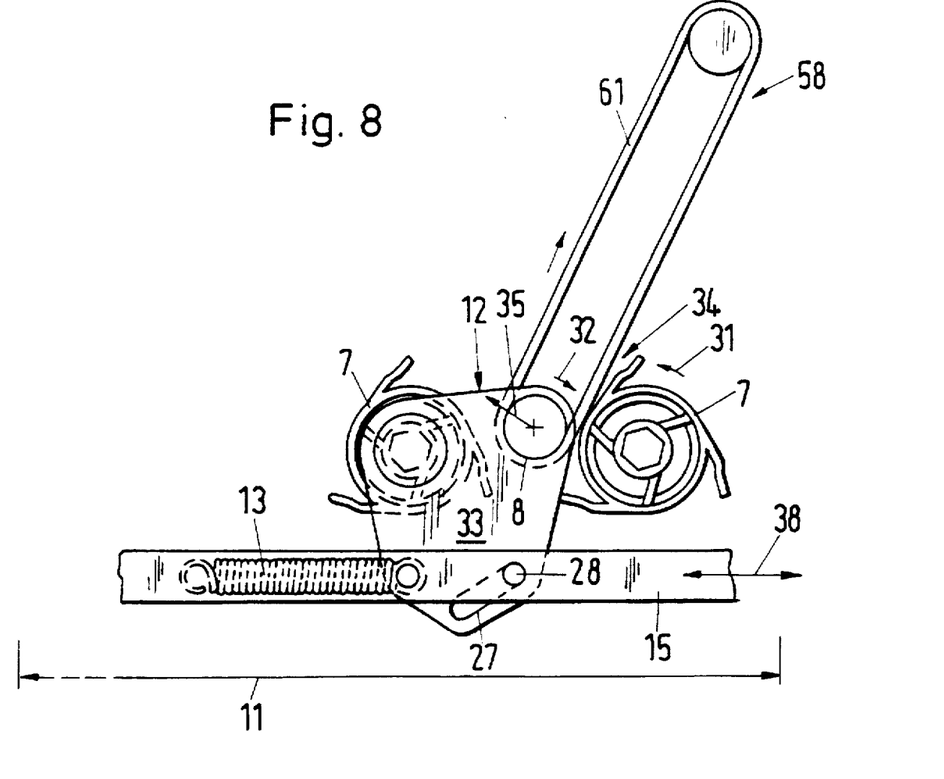
FIG. 8 shows a sectional representation to illustrate a third embodiment of the adjusting device.
Figure 9:
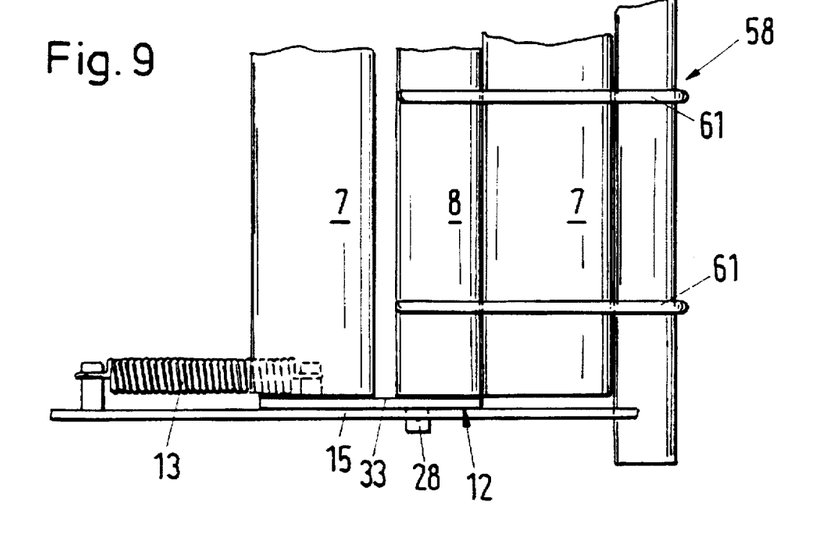
FIG. 9 shows a plan view of the representation of FIG. 8.

In FIGS. 8 and 9, a third embodiment of the adjusting apparatus is shown in the area of a group of roller bodies 7, 8, for which the correcting element 15 is disposed below the separating segment 11 formed by the roller bodies 7, 8. The supporting structure 12, which is formed here by only one swiveling element 33, is supported in each case so that it can pivot about the axis of the roller body 8 of a subsequent group immediately following in the direction of conveying and thus, when the correcting element 15 is moved in the direction of arrow 38, enables the working gap between the roller bodies 7, 8 within a group to be adjusted. Here also, the springs 13 assume the functions already described.

Figure 10:
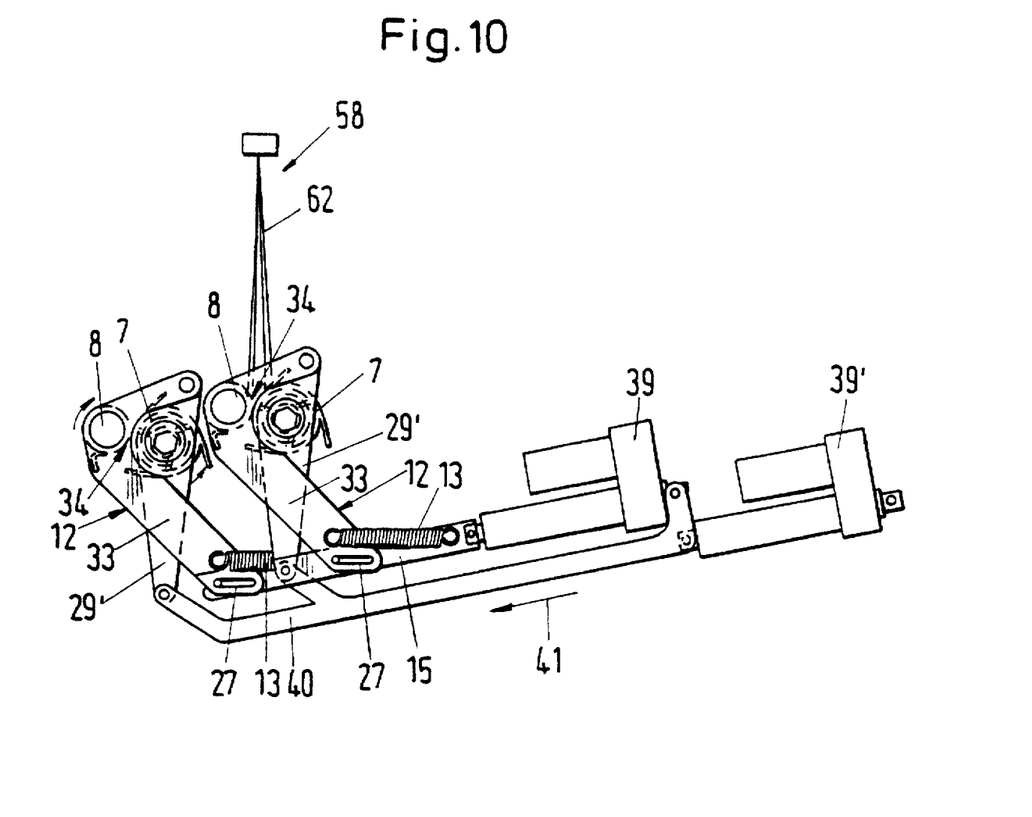
FIG. 10 shows a sectional representation to illustrate a fourth embodiment of the adjusting device.
Figure 11:
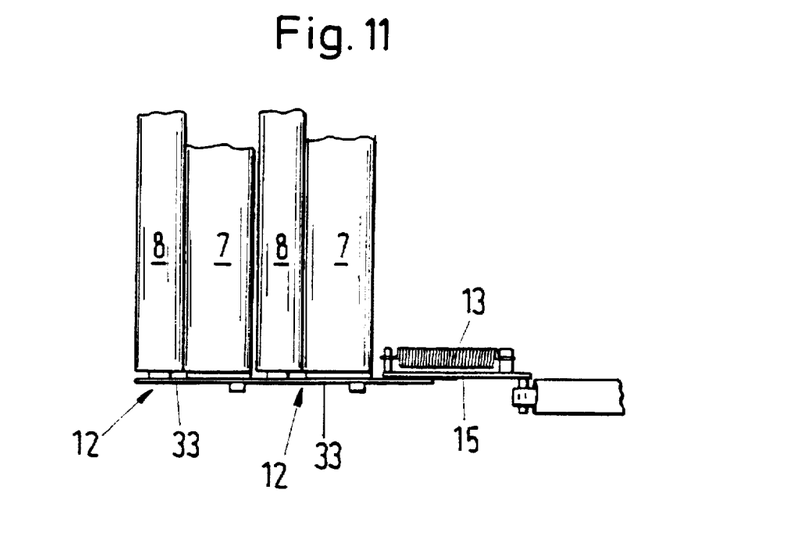
FIG. 11 shows a plan view of the representation of FIG. 10.

A further embodiment of the adjusting apparatus of respective groups of roller bodies 7, 8 is illustrated in FIGS. 10 and 11. For this embodiment, the connecting link 29' is connected with a coupling element 40 supporting the correcting element 15 together with its driving mechanism 39. Several connecting links 29', which are disposed behind one another, can be swiveled together. When the coupling element 40 is moved in the direction of arrow 41 by means of a drive mechanism 39', the roller bodies 8 of the group in the working position shown are swiveled concentrically about the first roller body 7 of the group, so that the roller bodies 8, while retaining the constant working gap 34, assume an elevated position with respect to the first roller body 7. When a stone or a similar hard object penetrates into the working gap 34, as described above, the respectively second roller body 8 of a group can be swiveled with its swiveling element 33 against the action of a spring 13 into a position enlarging the working gap 34 and, after the stone is ejected, returned into the working position.

Figure 12:
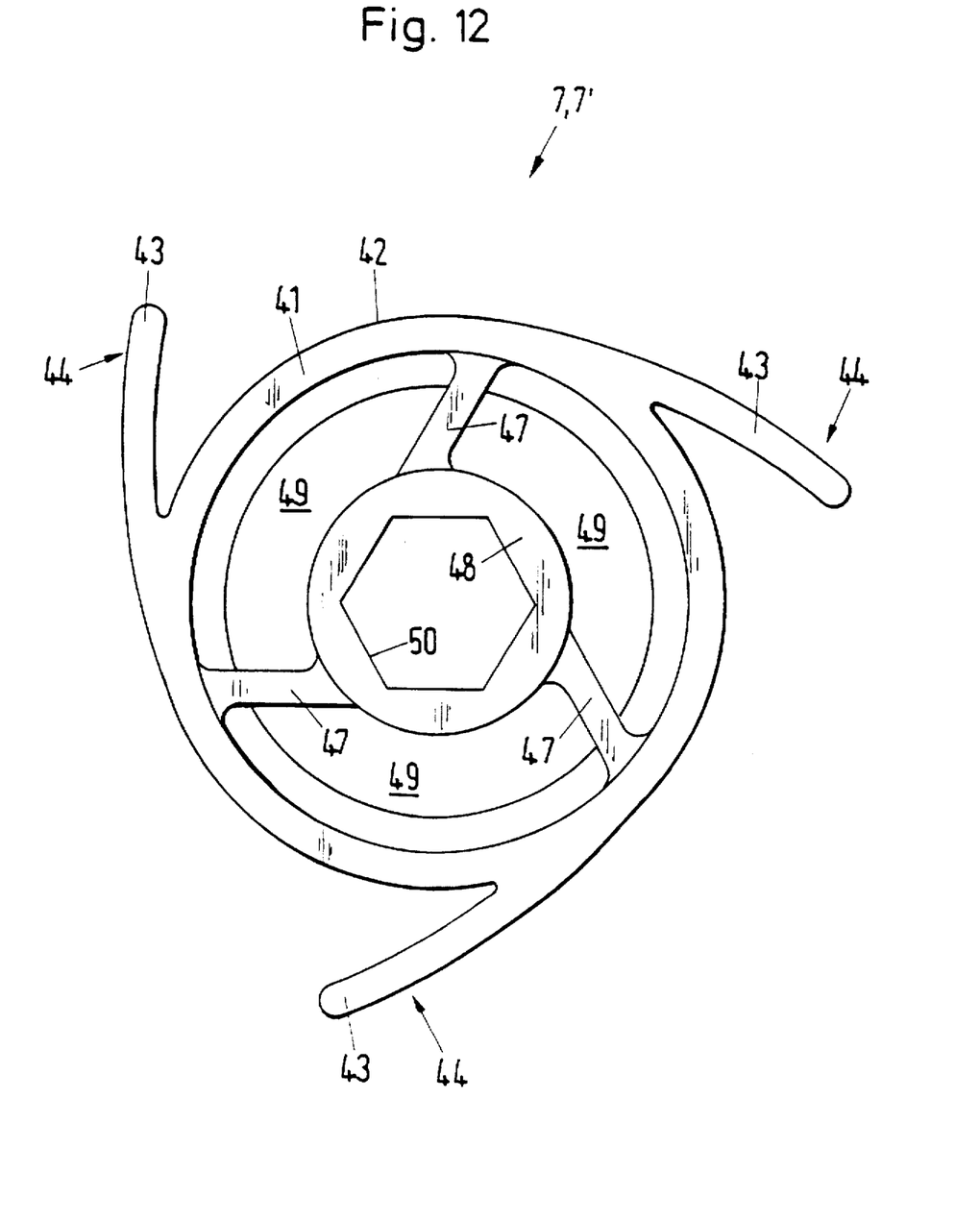
FIG. 12 shows an enlarged detailed representation of a roller body in a side view.

In FIG. 12, an embodiment of the first roller body 7, 7' is illustrated in an enlarged detailed representation, for which the roller body in each case has an elastically deformable casing part 41. At the periphery 42 of the roller body 7, 7', several parts 44, projecting over the contour of the cylindrical jacket part 41, are provided and constructed as conveying lips 43. In the case of the roller bodies 7, 7' of FIGS. 12 and 13, in each case three conveying lips 43, offset by 120°, are integrally molded to the periphery 42 of the casing part 41 and disposed tangentially to the casing part 41. The conveying lips 43 of FIG. 13 have a rebounding region 45, with which the separating and conveying action of the roller bodies 7, 7' in the installed position (FIG. 15) can be intensified.

Figure 13:
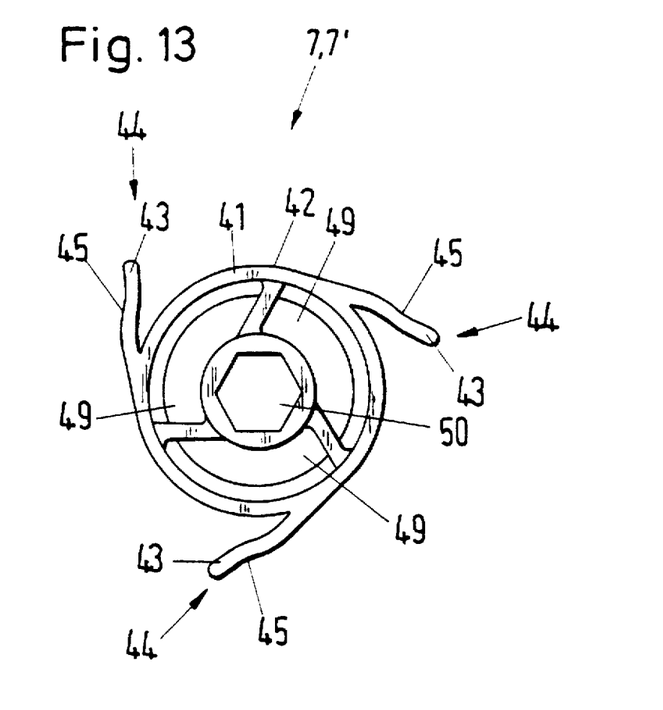
FIG. 13 shows a side view similar to that of FIG. 12 with projections of a different profile at the casing surface of the roller body.

The casing part 41 of the respective roller body 7, 7' of FIGS. 12 and 13 is connected over several elastic supporting spokes 47 with an inner hub 48. With that, in each case a deformation chamber 49 is formed in the circumferential direction of the roller body 7, 7' between the supporting spokes 47 and appropriate constructions of the conveying lips 43 are assigned to the region of the deformation chambers 49 of the casing part 41. The supporting spokes 47 are constructed in one piece with the hub 48 and protrude approximately tangentially from the latter, so that, upon deformation of the casing surface 41 during the separation process, the supporting spokes 47 are deformed in a specified direction.

Figure 14:
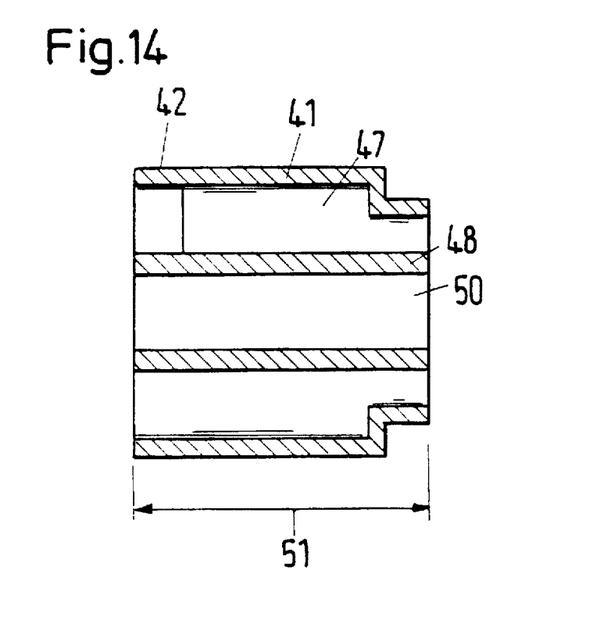
FIG. 14 shows a section through one of the segments forming a roller body.

The roller bodies 7, 8 are supported on a polygonal shaft (not shown) surrounded by a hexagonal recess 50, the roller bodies 7, 7' preferably being formed by roller body sections 51 (FIG. 14) lined up on the polygonal shaft. With that, the installation of the roller bodies 7, 7', as well as a rapid exchange for repair purposes, are possible.

Figure 15:
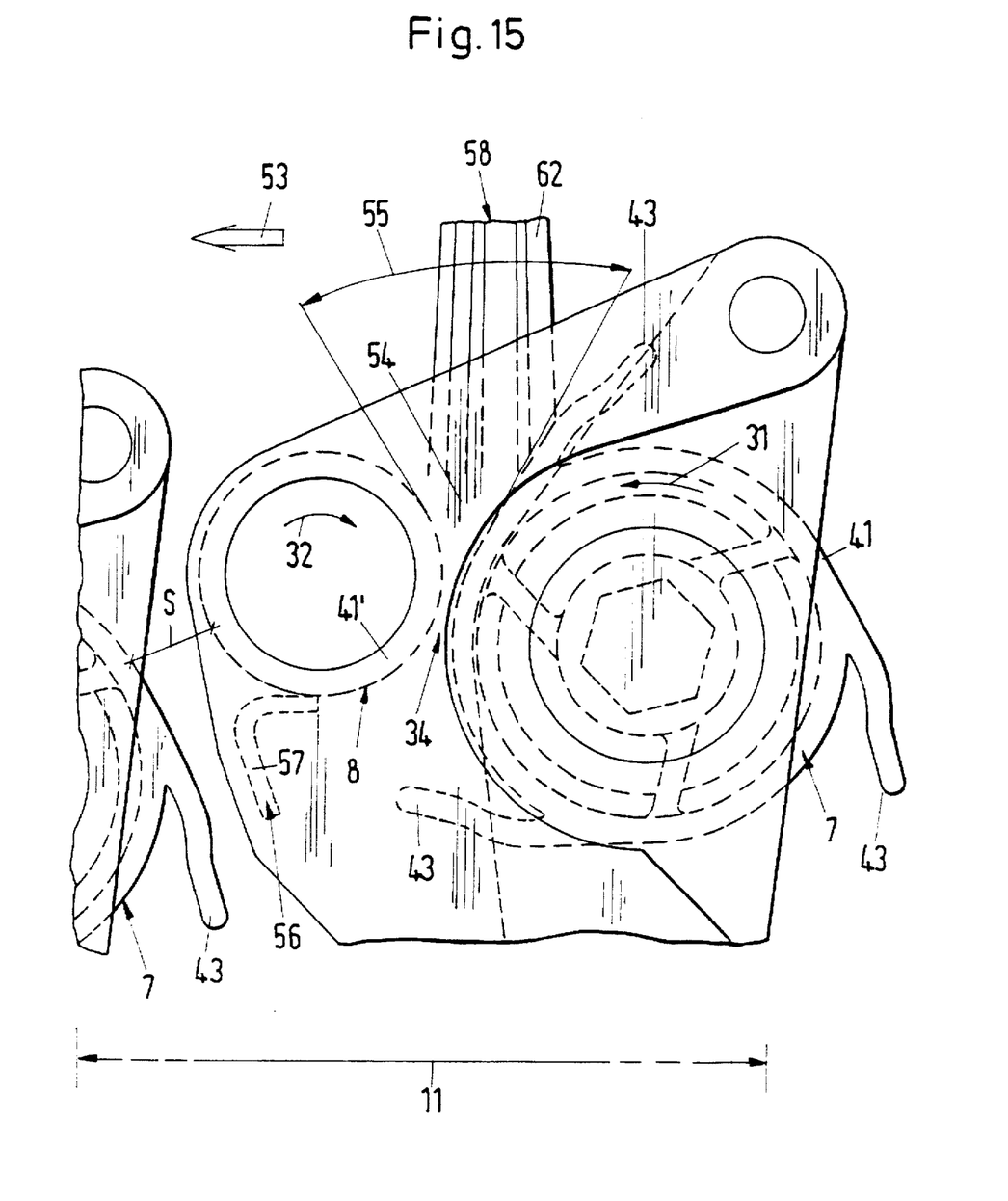
FIG. 15 shows an enlarged sectional representation in the region of the working gap of a group of roller bodies.

In FIG. 15, an enlarged sectional representation in the region of a group of roller bodies 7, 8 illustrates the geometric relationships in the region of the working gap 34 as well as in the region of the gap S between the groups. It becomes clear that the roller body 7, 7', which is the first in the direction 53 of the separation segment 11, carries out, in the region of its upper side formed by the casing surface 41, a revolving motion 31, which is directed towards the potato-discharging end 6 and that, during each revolution, an intensified conveying thrust is imparted with each conveying lip to the potatoes in the crotch 54 between the roller bodies 7, 8. The elastic conveying lips 43 act as an additional conveying element in such a manner that, upon entering the region of the crotch 54, they bring about a narrowing of the inlet angle 55 and, over their spring action, exert the intended conveying impetus on the potatoes in the conveying direction 53. The other materials 4, 5 are jammed in the region of the crotch 54 by the narrowing of the inlet angle 55 and discharge downward through the working gap 34.

The effectiveness of the conveying lips 43 can be maintained particularly owing to the fact that a stripper 56, which acts on the roller bodies 8, is provided in at least regions of the revolving area of the respective roller bodies 8. In an appropriate construction, the stripper 56 is constructed as a profiled body 57, which is disposed below the second roller body 8 and protrudes into the path of motion of the conveying lips 43.

In the embodiments of the apparatus 1, 1', described above, at least one material guide, generally labeled 58, is disposed above the roller bodies 7, 8 forming the separation segment 11. This material guide can be constructed according to FIG. 5 as a pendant guideway 59, according to FIG. 6 as a rubber plate 60, according to FIG. 8 as a round cord 61 and, according to FIGS. 10 and 15, as a rubber brush 62.

The enlarged representation of FIG. 15 makes clear the construction of the second roller body 8 of the respective group. In the area of its casing part 41', this second roller body 8 can be provided with a uniform layer of elastomer, which interacts in the area of the working gap 34 with the softer, first roller body 7.

It is, however, also possible to construct the second roller bodies 8 as non-yielding parts or to give them a development corresponding to that of the first roller bodies 7, 7'. The size of the working gap 34 depends on the desired separating result and on the relationships of the other materials. If the roller casings 41, 41' are sufficiently soft, the possibility also exists of permitting the two roller bodies of each group to work in the basic position already in mutually deforming engagement.

The aggressiveness during the separation process of the groups of roller bodies, 7, 7', 8, 8', which are rotating in opposite directions 31, 32, can be varied by adjusting the rpm individually for each roller body or in groups of several roller bodies so that, with little effort, adaptation to different separating tasks is attained. For example, by increasing the rpm of the second roller body 8, 8' with respect to that of the first roller body 7, 7', the aggressiveness can be increased or, by a corresponding decrease in the rpm of the second roller body 8, 8', the aggressiveness can be decreased.

We claim:

1. Apparatus for separating potatoes from other materials, comprising a frame structure which includes a separating segment extending from a potato-charging end to a potato-discharging end, a plurality of pairs of roller bodies having parallel axes and being disposed alongside one another along said separating segment, said axes of said roller bodies being disposed at right angles relative to said separating segment, each pair of said plurality of pairs of said roller bodies including a first roller body and a second roller body with the first roller body rotating in a rotary direction opposite to the direction of rotation of said second roller body, said first roller body of each pair being disposed closer to said potato-charging end than the second roller body of each respective pair, said first roller body of each pair including means exerting an enhanced conveying thrust to the potatoes in the crotch between each pair of roller bodies at least once during each revolution of said first roller body.

2. Apparatus according to claim 1 wherein said means exerting an enhanced conveying thrust to the potatoes comprises at least one projection extending from said first roller body of each pair.

3. Apparatus for separating potatoes from other materials according to claim 2 wherein said projection is made of an elastically deformable material providing a spring action to effect said enhanced conveying thrust.

4. Apparatus for separating potatoes from other materials according to claim 2 wherein said potatoes being separated move in a potato discharge direction from said potato-charging end to said potato-discharging end, said projection exerting said enhanced conveying thrust in said potato discharge direction, said first roller bodies having a cylindrical surface from which said at least one projection extends, said cylindrical surface exerting a general conveying thrust in said potato discharge direction to the potatoes in the crotch between said pairs of roller bodies, said enhanced conveying thrust being greater than said general conveying thrust.

5. Apparatus according to claim 1 wherein at least some of said roller bodies comprises an outer substantially cylindrical casing and a hub within said casing, and further comprising resilient spokes extending between said casing and said hub.

6. Apparatus according to claim 5 wherein said spokes define the boundary of deformation chambers between said casing and said hub such that a plurality of deformation chambers are formed by said casing, said hub and said spokes, said at least one projection extending from each portion of said casing which defines a deformation chamber.

7. Apparatus according to claim 6 wherein said spokes are integrally formed with said hub and extend generally tangentially from said hub.

8. Apparatus according to claim 1 wherein said separating segment includes two parts, and a shoulder between said two parts, the pairs of roller bodies in one of said two parts being disposed at a different elevation than the pairs of roller bodies in the other of said two parts.

9. Apparatus according to claim 1 further comprising adjusting means for adjusting the distance between the second roller body of a pair and the first roller body of a juxtaposed pair.

10. Apparatus according to claim 1 further comprising pivotal support means for pivotally supporting said second roller bodies for pivotal movement relative to the respective first roller bodies, said pivotal movement displacing the axes of the second roller bodies along a partial circular path.

11. Apparatus according to claim 10 further comprising adjusting means operably connected to said pivotal support means for adjusting the distance between the axes of said first and second roller bodies of each pair of roller bodies.

12. Apparatus according to claim 1 further comprising a material guide provided above the separating segment formed by said roller bodies.

13. Apparatus according to claim 1 further comprising shafts for supporting said roller bodies, said shafts having a polygonal cross sectional configuration.

14. Apparatus for separating potatoes from other materials according to claim 1 wherein said potatoes being separated move in a potato discharge direction from said potato-charging end to said potato-discharging end, said means exerting said enhanced conveying thrust in said potato discharge direction.

15. Apparatus for separating potatoes from other materials according to claim 1 wherein said potatoes being separated move in a potato discharge direction from said potato-charging end to said potato-discharging end, said first roller bodies having an outer cylindrical surface operable to exert a general conveying thrust in said potato discharge direction to the potatoes in the crotch between said first roller body and the second roller body, said means comprising at least one projection extending outwardly of said outer cylindrical surface of the first roller body, said projecting being operable to exert said enhanced conveying thrust in said potato discharge direction to the potatoes in said crotch between said first roller body and the second roller body, said enhanced conveying thrust being greater than said general conveying thrust.

16. Apparatus for separating potatoes from other materials according to claim 1 further comprising means for jointly and simultaneously adjusting the vertical height of a plurality of the second roller bodies of a plurality of said pairs of roller bodies relative to the vertical height of the plurality of first roller bodies of the last said plurality of pairs of roller bodies.

17. Apparatus for separating potatoes from other materials according to claim 1 wherein said second roller bodies are disposed at a higher elevation than said first roller bodies.

18. Apparatus for separating potatoes from other materials, comprising a frame structure which includes a separating segment extending from a potato-charging end to a potato-discharging end, a plurality of pairs of roller bodies having parallel axes and being disposed alongside of one another along said separating segment, said axes of said roller bodies being disposed at right angles relative to said separating segment, each pair of said plurality of pairs of said roller bodies including a first roller body and a second roller body with the first roller body rotating in a rotary direction opposite to the direction of rotation of said second roller body, said first roller body of each pair being disposed closer to said potato-charging end than the second roller body of each respective pair, said first roller body of each pair having a cross sectional configuration which exerts an enhanced conveying thrust to the potatoes in the crotch between each pair of roller bodies at least once during each revolution of said first roller body.

19. Apparatus according to claim 18 further comprising pivotal support means each mounting the second roller body of the pairs of roller bodies, a connecting member movably mounted on said frame structure and operably connected to a plurality of said pivotal support means to effect simultaneous pivoting of said plurality of pivot support means upon movement of said connecting member relative to said frame structure, and biasing means between each pivotal support means and said connecting member for biasing the respective pivotal support means in one pivotal direction.

20. Apparatus according to claim 19 wherein each of said pivotal support means has an elongated hole, said connecting member having a projection disposed within said elongated hole, said biasing means being connected to said projection to bias said projection toward one end of said elongated hole, said pivotal support means positioning the respective second roller body in a working position when said projection is disposed at said second end of said slot.

21. Apparatus according to claim 18 wherein the first roller body of each pair comprises a roller element having a substantially cylindrical body which is elastically deformable, said cylindrical element having an outer periphery, said at least one projection extending from said outer periphery.

22. Apparatus according to claim 21 wherein said first roller body of each pair has three of said projections spaced 120 degrees apart.

23. Apparatus according to claim 1 wherein said first roller of each pair has an outer periphery, said projection extending substantially tangentially from said outer periphery.

24. Apparatus according to claim 23 wherein said projection has an inner part and an outer part, said outer part being offset from said inner part such that said first and second parts are non-linearly disposed.

25. Apparatus according to claim 18 further comprising means for jointly and simultaneous adjusting the distance between a plurality of the first roller bodies of a plurality of said pairs of roller bodies and a plurality of the second roller bodies of the last said plurality of said pairs of roller bodies.

26. Apparatus according to claim 18 wherein said first roller bodies each have a rotatable axis, further comprising a connecting link rotatable about a first pivot axis coincident with the rotatable axis of said first roller body, and pivotal support means pivotally supported on said connecting link for pivotal movement about a second pivot axis, said second roller body being rotatably supported on said pivotal support means.

27. Apparatus according to claim 26 further comprising adjusting means connected to said connecting link for pivoting said connecting link about said first pivot axis, whereby pivoting of said connecting link about said first pivot axis displaces said second pivot axis relative to said first pivot axis.

28. Apparatus according to claim 18 further comprising a stripper juxtaposed to each pair of said roller bodies, said stripper comprising a stripper body which underlies said second roller body of a pair and extends into the path of motion of said projection on said first roller body.

29. Apparatus for separating potatoes from other materials comprising a frame structure which includes a separating segment extending from a potato-charging end to a potato-discharging end, said potatoes being separated moving in a potato discharge direction from said potato-charging end to said potato-discharging end, a plurality of pairs of roller bodies having parallel axes and being disposed alongside one another along said separating segment, each pair of said plurality of pairs of said roller bodies including a first roller body and a second roller body with the first roller body rotating in a rotary direction opposite to the direction of rotation of said second roller body, said first roller body of each pair being disposed closer to said potato-charging end than the second roller body of each respective pair, said first roller body of each pair including a structure exerting an enhanced conveying thrust in the potato-charging direction to the potatoes in the crotch between each pair of roller bodies at least once during each revolution of said first roller body, said first roller body having a surface from which said structure extends, said surface exerting a general conveying thrust in said potato discharge direction to the potatoes in the crotch between said pairs of roller bodies during each revolution of said first roller body, said enhanced conveying thrust being greater than said general conveying thrust.

30. Apparatus for separating potatoes from other materials according to claim 29 wherein said surface includes a cylindrical surface and said structure includes at least one projection extending from said surface.

31. Apparatus for separating potatoes from other materials comprising a frame structure which includes a separating segment extending from a potato-charging end to a potato-discharging end, said potatoes being separated moving in a potato discharge direction from said potato-charging end to said potato-discharging end, a plurality of pairs of roller bodies disposed alongside of one another along said separating segment, each pair of said plurality of pairs of said roller bodies including a first roller body and a second roller body with the first roller body rotating in a rotary direction opposite to the direction of rotation of said second roller body, said first roller body of each pair being disposed closer to said potato-charging end than the second roller body of each respective pair, said first roller body having an outer surface operable to impart a first conveying thrust in said potato discharge direction to the potatoes in the crotch between said first roller body and the second roller body, a projection extending from said outer surface of the first roller body, said projecting being operable to impart a second conveying thrust in said potato discharge direction to the potatoes in said crotch between said first roller body and the second roller body, said second conveying thrust being greater than said first conveying thrust.

32. Apparatus for separating potatoes from other materials comprising a frame structure which includes a separating segment extending from a potato-charging end to a potato-discharging end, a plurality of pairs of roller bodies having parallel axes and being disposed alongside one another along said separating segment, each roller body of a pair of roller bodies rotating in an opposite direction, said axes of said roller bodies being disposed at right angles relative to said separating segment, each of said pair of roller bodies including a first roller body and a second roller body, said first roller body of each pair being disposed closer to said potato-charging end than the second roller body of each respective pair, said first roller body of each pair including at least one projection exerting an enhanced conveying thrust to the potatoes at least once during each revolution of said first roller body, a pivotal support means each mounting the second roller body of the pairs of roller bodies, a connecting member mounted on said frame structure and operably connected to a plurality of said pivotal support means to effect pivoting of said plurality of pivotal support means, and biasing means between each pivotal support means and said connecting member for biasing the respective pivotal support means in one pivotal direction, a track on said frame structure, said track receiving guide wheels, said guide wheels pivotally supporting said pivotal support means.

* * * * *